(12) United States Patent
Chico de Guzman Huerta et al.

(10) Patent No.: US 10,216,503 B2
(45) Date of Patent: Feb. 26, 2019

(54) DEPLOYING, MONITORING, AND CONTROLLING MULTIPLE COMPONENTS OF AN APPLICATION

(71) Applicant: ElasticBox, Inc., Mountain View, CA (US)

(72) Inventors: Pablo Chico de Guzman Huerta, Murica (ES); Alberto Arias Maestro, Mountain View, CA (US); Ramiro Berelleza Perez, San Francisco, CA (US)

(73) Assignee: ElasticBox Inc., Broomfield, CO (US)

( * ) Notice: Subject to any disclaimer, the term of this patent is extended or adjusted under 35 U.S.C. 154(b) by 0 days.

(21) Appl. No.: 14/206,335

(22) Filed: Mar. 12, 2014

(65) Prior Publication Data

US 2014/0282495 A1 Sep. 18, 2014

Related U.S. Application Data

(60) Provisional application No. 61/780,349, filed on Mar. 13, 2013.

(51) Int. Cl.
*G06F 9/44* (2018.01)
*G06F 8/61* (2018.01)

(52) U.S. Cl.
CPC ...................... *G06F 8/61* (2013.01)

(58) Field of Classification Search
CPC ........................................... G06F 8/61
See application file for complete search history.

(56) References Cited

U.S. PATENT DOCUMENTS

| 6,041,347 A | 3/2000 | Harsham et al. |
| 7,721,292 B2* | 5/2010 | Frasier .................... G06F 9/505 709/226 |
| 7,996,723 B2 | 8/2011 | Levine et al. |
| 8,261,295 B1* | 9/2012 | Risbood .............. G06F 9/44505 719/328 |
| 8,291,079 B1* | 10/2012 | Colton .................. G06F 9/5061 709/223 |
| 8,359,389 B1 | 1/2013 | Cohen et al. |

(Continued)

FOREIGN PATENT DOCUMENTS

| CN | 102868763 A | 1/2013 |
| CN | 102904969 A | 1/2013 |

(Continued)

OTHER PUBLICATIONS

Almeida et al., "Towards an SPL-Based Monitoring Middleware Strategy for Cloud Computing Applications", In proceeding of: 10th International Workshop on Middleware for Grids, Clouds and e-Science ( MGC 2012), at Quebec, Canada, vol. 1, 2012, 6 pages.

(Continued)

*Primary Examiner* — Matthew J Brophy
(74) *Attorney, Agent, or Firm* — Adsero IP

(57) ABSTRACT

A request to deploy a cloud-based application is received, and a unique identifier is assigned thereto. A server is selected and an agent program is installed thereon. A script queue stores a plurality of commands for the installation and configuration of the application, and the commands are sent to the agent for execution on the server, the execution of the commands causing installation and configuration of the application on the server.

17 Claims, 3 Drawing Sheets

(56) References Cited

U.S. PATENT DOCUMENTS

| | | | |
|---|---|---|---|
| 8,380,845 B2 | 2/2013 | Mercuri | |
| 8,434,080 B2* | 4/2013 | Yendluri | G06F 9/5072 717/177 |
| 8,495,611 B2* | 7/2013 | McCarthy | G06F 9/5072 709/203 |
| 8,549,066 B1* | 10/2013 | Donahue | G06F 9/5072 709/203 |
| 8,578,443 B2 | 11/2013 | Narain et al. | |
| 8,600,941 B1 | 12/2013 | Raj et al. | |
| 8,612,566 B2 | 12/2013 | Ferris et al. | |
| 8,612,599 B2 | 12/2013 | Tung et al. | |
| 8,627,426 B2* | 1/2014 | Lucovsky | G06F 9/45533 455/456.1 |
| 8,739,157 B2* | 5/2014 | Ho | G06F 9/5077 714/3 |
| 8,776,053 B2* | 7/2014 | Lagergren | G06F 9/5077 718/1 |
| 8,813,065 B2* | 8/2014 | Zygmuntowicz | G06F 8/60 717/120 |
| 9,250,887 B2* | 2/2016 | Lucovsky | G06F 9/45533 |
| 9,288,117 B1* | 3/2016 | Angrish | G06F 15/177 |
| 9,311,161 B2* | 4/2016 | Jagtap | G06F 9/5072 |
| 9,495,215 B2* | 11/2016 | Podvratnik | G06F 9/5027 |
| 9,529,602 B1* | 12/2016 | Swierk | G06F 9/441 |
| 9,772,831 B2* | 9/2017 | Lucovsky | G06F 8/60 |
| 2006/0136761 A1* | 6/2006 | Frasier | G06F 9/505 713/320 |
| 2010/0153482 A1* | 6/2010 | Kim | G06F 8/61 709/201 |
| 2011/0113086 A1 | 5/2011 | Long et al. | |
| 2011/0131499 A1 | 6/2011 | Ferris et al. | |
| 2011/0154314 A1* | 6/2011 | Balasubramanian | G06F 8/65 717/171 |
| 2011/0265164 A1* | 10/2011 | Lucovsky | G06F 9/45533 726/7 |
| 2011/0295727 A1 | 12/2011 | Ferris et al. | |
| 2012/0054332 A1 | 3/2012 | Sahu et al. | |
| 2012/0072579 A1 | 3/2012 | Teather | |
| 2012/0096149 A1 | 4/2012 | Sunkara et al. | |
| 2012/0233315 A1 | 9/2012 | Hoffman et al. | |
| 2012/0278439 A1 | 11/2012 | Ahiska et al. | |
| 2012/0283017 A1* | 11/2012 | Ahiska | A63F 13/77 463/40 |
| 2012/0290647 A1 | 11/2012 | Ellison et al. | |
| 2012/0290706 A1 | 11/2012 | Lin et al. | |
| 2012/0303778 A1* | 11/2012 | Ahiska | A63F 13/355 709/223 |
| 2012/0311564 A1* | 12/2012 | Khalid | G06F 8/61 718/1 |
| 2012/0330711 A1 | 12/2012 | Jain et al. | |
| 2012/0331125 A1 | 12/2012 | Li et al. | |
| 2013/0007265 A1 | 1/2013 | Benedetti et al. | |
| 2013/0066770 A1 | 3/2013 | Das et al. | |
| 2013/0159529 A1 | 6/2013 | Mitchell et al. | |
| 2013/0179925 A1 | 7/2013 | Woods et al. | |
| 2013/0232252 A1 | 9/2013 | Huang et al. | |
| 2013/0232463 A1 | 9/2013 | Nagaraja et al. | |
| 2013/0232497 A1 | 9/2013 | Jalagam et al. | |
| 2013/0263209 A1 | 10/2013 | Panuganty | |
| 2013/0268357 A1 | 10/2013 | Heath | |
| 2013/0346268 A1 | 12/2013 | Pereira et al. | |
| 2014/0026122 A1 | 1/2014 | Markande et al. | |
| 2014/0096134 A1* | 4/2014 | Barak | G06F 9/45558 718/1 |
| 2014/0189680 A1* | 7/2014 | Kripalani | G06F 11/3664 717/176 |

FOREIGN PATENT DOCUMENTS

| | | |
|---|---|---|
| CN | 202889392 U | 4/2013 |
| CN | 103092698 A | 5/2013 |
| CN | 103095719 A | 5/2013 |
| CN | 103139229 A | 6/2013 |
| CN | 103139270 A | 6/2013 |
| CN | 103167003 A | 6/2013 |
| EP | 2381363 A2 | 10/2011 |
| EP | 2591423 A1 | 5/2013 |
| KR | 10-2013-0047438 A | 5/2013 |
| KR | 10-2013-0085473 A | 7/2013 |
| KR | 10-2013-0099424 A | 9/2013 |
| WO | 2010/127365 A1 | 11/2010 |
| WO | 2011/082385 A2 | 7/2011 |
| WO | 2012/087105 A1 | 6/2012 |
| WO | 2012/154310 A1 | 11/2012 |
| WO | 2013/062546 A1 | 5/2013 |
| WO | 2013/104217 A1 | 7/2013 |
| WO | 2013/142210 A1 | 9/2013 |
| WO | 2013/166126 A1 | 11/2013 |
| WO | 2013/173128 A1 | 11/2013 |
| WO | 2013/184133 A1 | 12/2013 |
| WO | 2013/184134 A1 | 12/2013 |
| WO | 2013/184137 A1 | 12/2013 |

OTHER PUBLICATIONS

CA Technologies, "CA Nimsoft Monitor: Delivering a Unified Monitoring Architecture", White Paper, Sep. 2013, 14 pages.

IBM, "Foundations of IBM Cloud Computing Architecture V3", IBM Professional Certification Program, Test C2030-283, Retrieved on Apr. 29, 2014, available online at <http://www-03.ibm.com/certify/tests/objC2030-283.shtml>, 23 pages.

IBM Software, "IBM SmartCloud Monitoring—Application Insight: New Solution, New Architecture, for Cloud Application Performance Monitoring", Product Brief, Enterprise Management Associates, Inc., 2013, pp. 1-3.

Piuri, Vincenzo, "Dependable Cloud Computing Frameworks for Critical Monitoring and Control Applications", 11th IEEE International Conference on Networking, Sensing and Control, IEEE Systems, Man, and Cybernetics Society Miami, FL, USA, Apr. 7-9, 2014.

* cited by examiner

DEPLOYING, MONITORING, AND CONTROLLING MULTIPLE COMPONENTS OF AN APPLICATION

CROSS-REFERENCE TO RELATED APPLICATIONS

This application claims priority to and the benefit of U.S. Provisional Patent Application Ser. No. 61/780,349, filed on Mar. 13, 2013, which is hereby incorporated herein by reference in its entirety.

TECHNICAL FIELD

Embodiments of the present invention relate generally to cloud computing and, in particular, to deploying cloud-computing applications.

BACKGROUND

Cloud computing, as the general process for network-based/remote processing is known, offers several advantages over local computing, especially in the context of application software: agility, cost reduction, reliability, scalability, performance, and ease of maintenance. Cloud-computing applications also present unique challenges, however, related to deployment, machine provision in a cloud provider, and the installation of the application software. For example, the deployment process might fail and need to be restarted several times before the application is fully deployed, and this restart process must be done gracefully so that no data is lost (known as "idempotency"). The provisioning of more resources than necessary is wasteful, and should be avoided or minimized. Different application software may have different requirements in terms of operating systems or available software utilities, and these requirements must be met. Finally, if the application is deployed on different servers or systems, data dependencies between the various servers (known as "bindings") must be respected such that, for example, if a first server needs the results from a second server to be deployed, that dependency is tracked and managed. A need therefore exists for a way to automatically, reliably, and replicatably manage the deployment of cloud-based applications.

SUMMARY

In general, various aspects of the systems and methods described herein deploy applications into the cloud in an automated, replicable, and reliable manner. A request to deploy a cloud-based application is received, and a unique identifier is assigned thereto. A server is selected and an agent program is installed thereon. A script queue stores a plurality of commands for the installation and configuration of the application, and the commands are sent to the agent for execution on the server, the execution of the commands causing installation and configuration of the application on the server.

In one aspect, a method for deploying an application includes electronically receiving a request to deploy a cloud-based application, the request comprising information about the application; assigning a unique identifier to the received request; selecting a server from a plurality of servers upon which to deploy the application; causing installation of an agent program on the selected server; storing a plurality of commands in a script queue in a computer memory, the commands comprising computer instructions for the installation and configuration of the application; and sending the unique identifier and the commands to the agent for execution on the server, the execution of the commands causing installation and configuration of the application on the server.

The information about the application in the request may include a name, type, or version of the application, an operating system or computing environment on which the application is to run or execute, a name or type of a cloud provider on which the application is to be deployed, or specifications of computing resources. The information about the application in the request may include a data dependency with another cloud-based application. The plurality of servers may be queried to determine an amount of resources available thereon. An indication of failure of installation may be received from the agent and re-sending the plurality of commands thereto. A message may be sent to the server to thereby allocate resources on the server. Messages indicating success or failure of the installation of the application may be received from the agent. The agent may include a server-provider identifier for indicating its presence on the server. The agent may install software dependencies related to the application or configuration files related to the application on the server. A logging queue may receive logging information from the agent. An event queue may store and send the commands.

In another aspect, a system for deploying an application includes a computer processor configured for executing computer instructions for computationally executing the steps of: electronically receiving a request to deploy a cloud-based application, the request comprising information about the application; assigning a unique identifier to the received request; selecting a server from a plurality of servers upon which to deploy the application; causing installation of an agent program on the selected server; storing a plurality of commands in a script queue, the commands; and sending the unique identifier and commands comprising computer instructions for the installation and configuration of the application to the agent for execution on the server, the execution of the commands causing installation and configuration of the application on the server; and a computer memory for storing a plurality of commands in a script queue.

The information about the application in the request may include a name, type, or version of the application, an operating system or computing environment on which the application is to run or execute, a name or type of a cloud provider on which the application is to be deployed, or specifications of computing resources. The information about the application in the request may include a data dependency with another cloud-based application. The agent may include a server-provider identifier for indicating its presence on the server. The agent may install software dependencies related to the application or configuration files related to the application on the server. The computer memory may further include a logging queue for receiving logging information from the agent and/or an event queue for storing and sending the commands.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
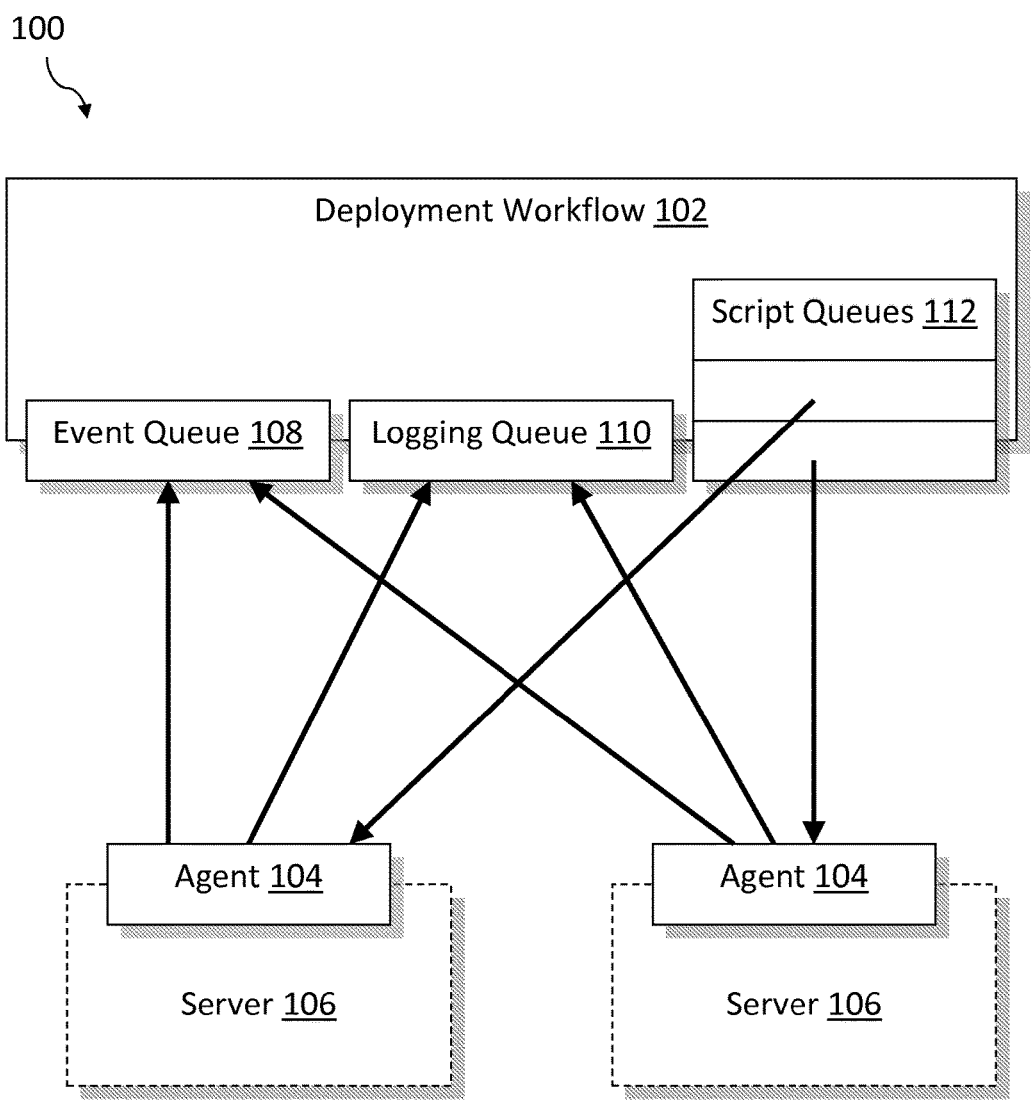
FIG. 1 illustrates a system for deploying applications in a cloud-computing environment in accordance with embodiments of the present invention.

FIG. 1 illustrates one embodiment of a system 100 for the automatic deployment of applications in a cloud-computing environment. A deployment workflow 102 gathers information required about the deployment of an application, and agents 104 installed on or otherwise in communication with servers 106 set up, execute, and monitor the application as it executes on the servers 106. As explained in greater detail below, a number of queues 108, 110, 112 manage messages between the deployment workflow 102 and the agents 104 to thereby deploy and monitor the applications.

In one embodiment, the deployment workflow 102 receives a request to deploy one or more cloud-based applications. The request may be received from a user, from a client device operated by a user, from a software application, from another cloud-based application, or from any other source, and the request may be in the form of any type of electronic communication, such as an email, an HTTP request, via a software API, or by any other such means of communication.

The request may contain one or more items of information or data. For example, the request may specify the name, type, or version of the application software to be deployed, the operating system or computing environment on which the application is to run or execute, a name or type of a cloud provider on which the application is to be deployed, specifications of computing resources (e.g., minimum, maximum, or average memory requirements, CPU processing requirements, storage requirements, or bandwidth requirements), a minimum or maximum amount of time in which the application is to complete running or otherwise deliver data, a number of servers on which the application is to run, or any dependencies that exist between data produced by the application and other applications. The request may further include the identity of the requesting user or application, account information (e.g., login and password) for target cloud-services providers, or financial/billing information related thereto.

When the deployment workflow 102 receives the request, it selects one or more servers 106 on which the requested application is to be deployed. The servers 106 may be part of the same or different cloud-computing environments. Each server 106 may have different types of resources available and/or different amounts of resources available, based on the capabilities of each server 106 and any other programs executing thereon. The deployment workflow 102 may query the servers 106 and/or providers thereof upon receipt of the request, or it may refer to information about the servers 106 or providers collected previously (e.g., in response to a previous request). In various embodiments, a cloud-computing provider allows selection of individual servers 106; in other embodiments, the cloud-computing provider allows selection only between different server packages or types, and the selection of the individual servers 106 is performed by the cloud-computing provider. The present invention is not limited to any particular method of selection of the servers 106.

The deployment workflow 102 may assign a unique identifier to the received deployment request; this identifier may allow the deployment workflow 102 to restart the deployment process, in the case of an error or failure condition, at or near the point of failure/error. The failure or error may be reported by the agent 104 if, for example, the installation or configuration of the application fails. In other embodiments, the deployment workflow 102 may infer an error or failure condition if a certain amount of time has passed and the agent 104 has not reported a successful deployment (or if the deployment workflow 102 otherwise loses communication with the agent 104). In the event of an error or failure, the deployment workflow 102 may restart the deployment process as it is described elsewhere in this document.

Once one or more servers 106 have been selected, the deployment workflow 102 may send a message to the server 106 and/or associated cloud-services provider to allocate the resources specified in the received request (and/or inferred from other information in the received request). The allocation message may be tailored or otherwise customized for a particular cloud-services provider. The server 106 may thus be allocated to use specified amounts of memory, processing power, storage, and/or throughput as required.

Once one or more servers 106 have been selected and allocated, the deployment workflow 102 sends a request or message to the server 106 to cause the installation of an agent 104 thereon. The agent-installation request may be sent using a script queue 112, as explained in greater detail below, or as a separate message (such as a "start script" as specified/allowed by a cloud-services provider associated with the server 106). The server 106, in response to the request, installs the agent 104 in accordance with any software-installation procedures or protocols associated with the server 106 or associated cloud-service provider. In various embodiments, the files and/or data necessary for the installation of the agent 104 (i.e., the install package) may be sent from the deployment workflow 102, downloaded from a third-party file, web, or other server, copied from another server 106 and/or or other server associated with the cloud-service provider, and/or downloaded from a device associated with the requesting user or system. The request received by the deployment workflow may specify a name, type, version, target operating system, or other details about the agent 104 to be installed; in other embodiments, the deployment workflow 102 and/or server 106 selects one of a plurality of possible agents 104 based on, for example, a type of operating system running on the server 106 or requested for the application.

In one embodiment, an agent 104 is already installed on a server 106 (perhaps as a result of a previous deployment request initiated by the deployment workflow 102). In order to distinguish between an agent 104 installed from a previous, unrelated request and a current request, the agent 104 may receive or generate a server-provider identifier number or string. When the agent 104 starts, it may check that the server-provider identifier of the server 106 on which the agent 104 is running matches the value stored by the agent 104, and the agent 104 may stop its execution if the identifiers are different (and possibly send a message to the deployment workflow 102 so indicating its stopping).

In one embodiment, the deployment workflow 102 creates a script queue 112 for each deployed agent 104. The deployment workflow 102 may add scripts, programs, specifications, or other instructions necessary to install, configure, and deploy the requested application to the script queue 112. The agent 104 may, for example, in response to received scripts, install the requested application on the server 106, check for operating-system or software dependencies required by the application and download/install said dependencies, generate configuration files for the application and/or associated applications, monitor resource utilization on the server 106, and or perform any other such function required by the application and/or requester.

The agent 104 may receive the scripts entered into its associated script queue 112; the scripts may be delivered to the agent 104 in response to a request therefrom (e.g., a "pull" operation) or sent to the agent 104 as they are loaded into the script queue 112 (e.g., a "push" operation). The agent 104 may further read or receive scripts from the script queue 112 in response to an event placed in an event queue 108, as explained further below.

The deployment workflow 102 may further include two additional queues: an event queue 108 and a logging queue 110. The event queue 108 may be used to send instructions or other commands to the agents 104 and/or to receive information back from the agents 104, such as notification of receipt of a command or notification of successful or unsuccessful execution of a command. As mentioned above, the deployment workflow 102 may place a command into the event queue 108 indicating that an agent 104 should download and execute a script in the script queue 112; the agent 104 may then respond by placing a message in the event queue 108 of receipt of or of completion of the script. The agent 104 may further place messages in the event queue 108 indicating completion of sub-steps within a given script. In one embodiment, the agent 104 places a message in the event queue 108 when the agent 104 and/or server instance 106 is first created/installed; the deployment workflow 102 may, in response, begin adding commands to the event queue 108 instructing the agent 104 to begin executing scripts in the script queue 112. Any scripts in the script queue 112 may be executed by the agent 104 in parallel or in series (depending on dependencies between the various scripts); the agent 104 may place messages in the event queue 108 indicating completion of various scripts and, in response, the deployment workflow 102 may place additional, dependent scripts in the event queue 108. In various embodiments, entries in the queues 108, 110 may be tagged or otherwise associated with the unique identifier for each request to distinguish between entries in the queues 108, 110 for different agents 104.

The logging queue 110 may used by the agent 104 to send, periodically, in real time, and/or in response to a request, any output produced by execution of the scripts. The output may be an indication of success or failure and/or information or data produced by the script.

In some embodiments, a script executed by the agent 104 on the server 106 includes a function, procedure, "dispatcher," or similar construct that is passed to and executed by a next script to run on the server 106. This function may contain global information required by multiple scripts, such as the user of the installation process, deployment identifier, configured shell variables, or a script build/run environment or container. Information in the function may be supplied by the deployment workflow 102 and/or by information gathered by the execution of the current script.

In one embodiment, the agent 104 keeps running after the application is deployed, allowing for future execution of scripts to (for example) shutdown, dispose of, or upgrade the application. As part of the agent installation, a recurrent task may be configured that checks if a new version of the agent 104 is available. If so, the agent 104 is stopped and reinstalled.

Figure 2:
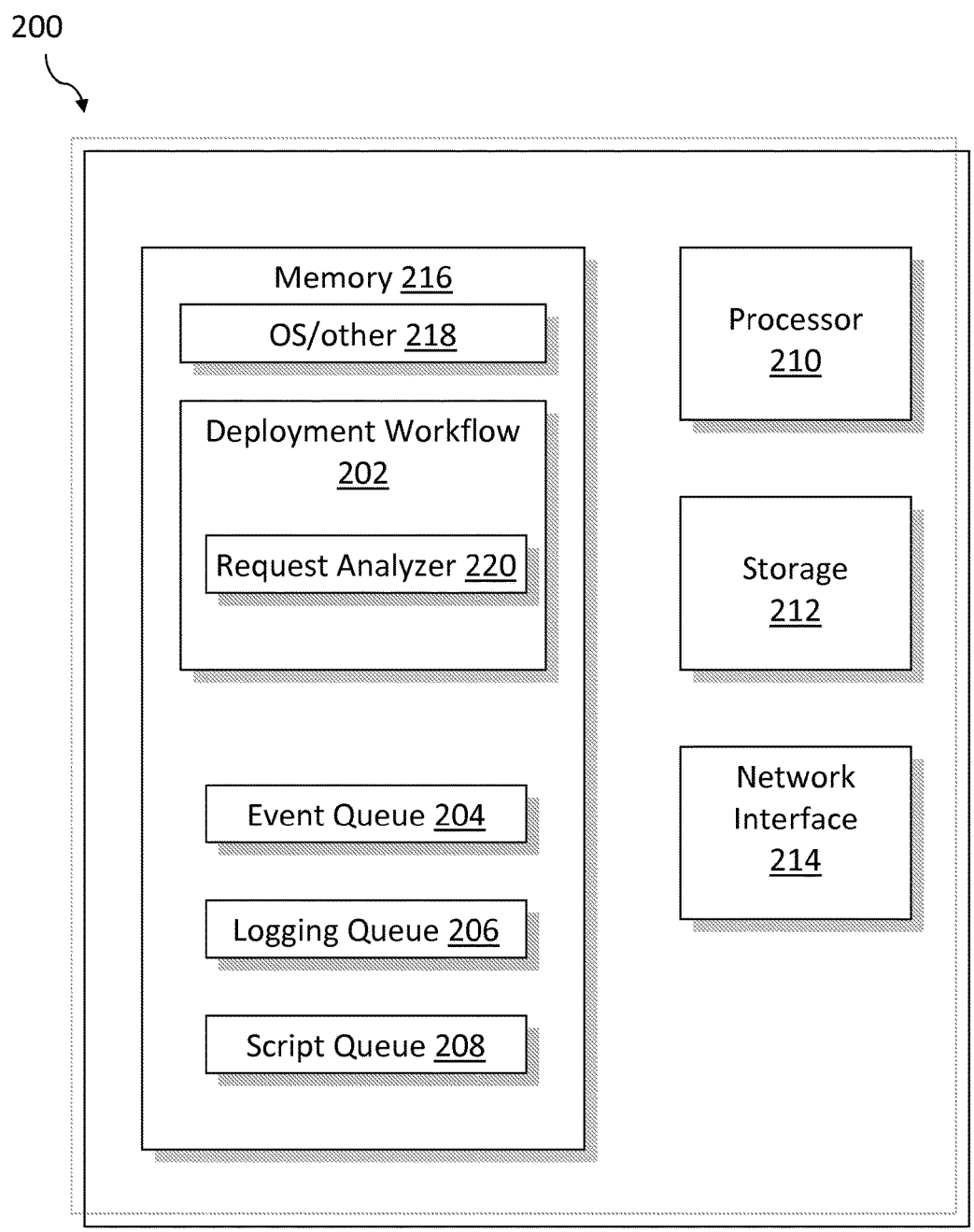
FIG. 2 illustrates a deployment workflow in accordance with embodiments of the present invention.

FIG. 2 illustrates an embodiment of a server 200 that includes the deployment workflow 202 and associated queues 204, 206, 208 depicted in FIG. 1. In this embodiment, the server 200 includes a processor 210, such as an INTEL XEON, non-volatile storage 212, such as a magnetic, solid-state, or flash disk, a network interface 214, such as ETHERNET or WI-FI, and a volatile memory 216, such as SDRAM. The storage 212 may store computer instructions which may be read into memory 216 and executed by the processor 210. The network interface 214 may be used to communicate with hosts in a cluster and/or a client, as described above. The present invention is not, however, limited to only the architecture of the server 200, and one of skill in the art will understand that embodiments of the present invention may be used with other configurations of servers or other computing devices.

The memory 216 may include instructions 218 for low-level operation of the server 200, such as operating-system instructions, device-driver-interface instructions, or any other type of such instructions. Any such operating system (such as WINDOWS, LINUX, or OSX) and/or other instructions are within the scope of the present invention, which is not limited to any particular type of operating system. The memory further includes instructions for the deployment workflow 202, as described in greater detail above; these instructions may include instructions for a request analyzer 220 for receiving, analyzing, and processing requests. The memory 216 further includes queues 204, 206, 208, which may be stored using any data structure, including queues, lists, arrays, trees, or any other such structure. Again, the present invention is not limited to only this allocation of instructions, and any such arrangement is within its scope.

Figure 3:
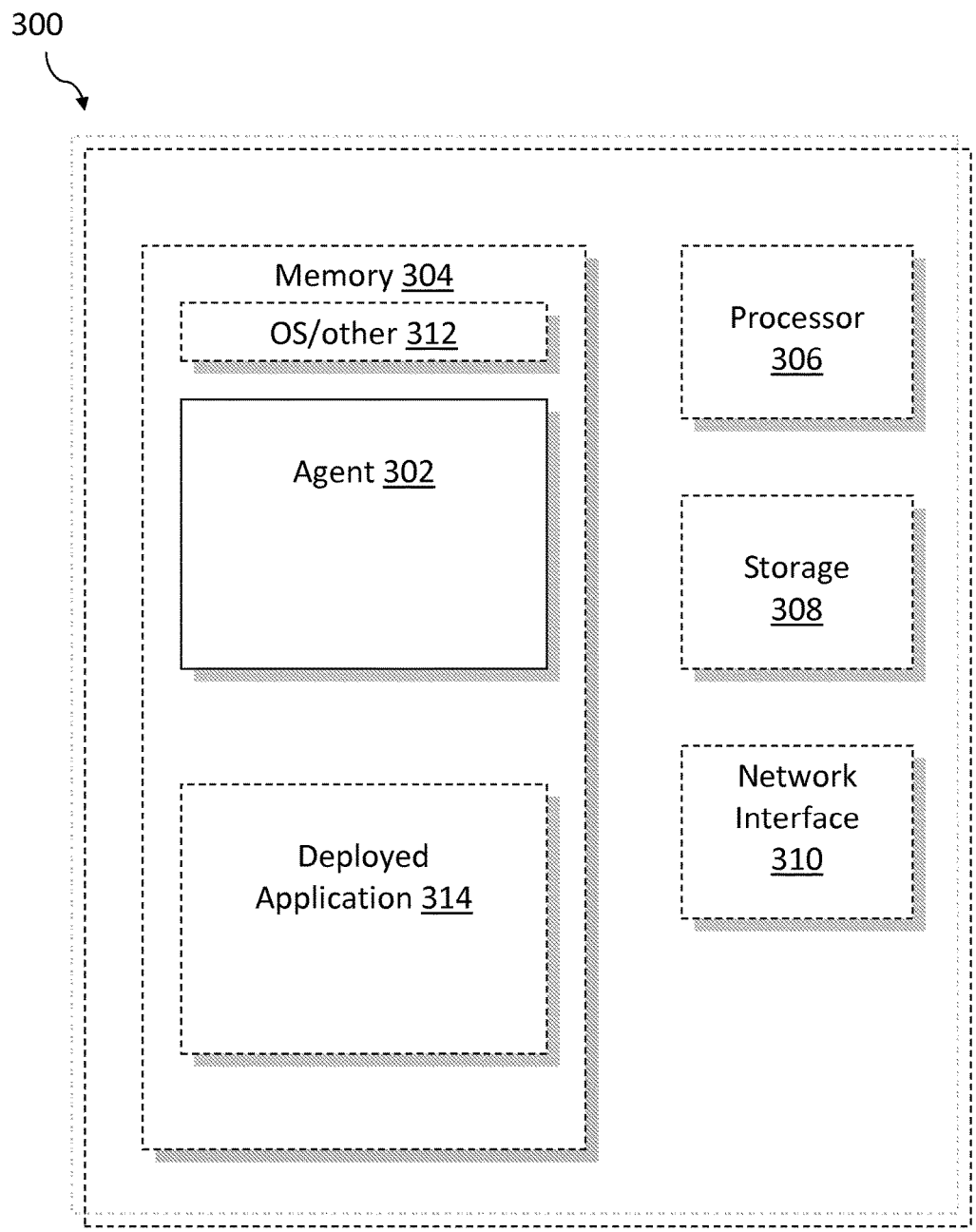
FIG. 3 illustrates an agent in accordance with embodiments of the present invention.

FIG. 3 illustrates an exemplary server 300 having an agent 302 installed in the memory 304 therein. As discussed above with reference to FIG. 2, the server 300 may include other components/features, such as a processor 306, storage 308, network interface 310, OS 312, and a deployed application 314. The present invention is not, however, limited to only the server configuration of FIG. 3, and any such server or computing system is within the scope of the present invention.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for deploying an application, the method comprising:
   electronically receiving a request to deploy a cloud-based application, the request comprising information about the application but not including the application or portions thereof, wherein the request further includes information indicating for the application at least one of minimum, maximum, or average memory requirements, processing requirements, storage requirements, or bandwidth requirements;
   assigning a unique identifier to the received request;
   selecting a server from a plurality of servers upon which to deploy the application;
   sending a message to the server to allocate for the application at least one of memory, processing power, storage, or throughput on the server before the application is deployed;
   causing installation of an agent program on the selected server;
   storing a plurality of commands in a script queue in a computer memory, the commands comprising computer instructions for the installation and configuration of the application; and
   automatically sending the unique identifier that identifies the received request to deploy the cloud-based application to the agent program and sending the commands to the agent program for execution of the commands on the server, the execution of the commands causing installation and configuration of the application on the server.

2. The method of claim 1, wherein the information about the application in the request comprises a name, type, or version of the application, an operating system or computing environment on which the application is to run or execute, a name or type of a cloud provider on which the application is to be deployed, or specifications of computing resources.

3. The method of claim 1, wherein the information about the application in the request comprises a data dependency with another cloud-based application.

4. The method of claim 1, further comprising querying the plurality of 2 servers to determine an amount of resources available thereon.

5. The method of claim 1, further comprising receiving an 2 indication of failure of installation from the agent program and re-sending the plurality of commands thereto.

6. The method of claim 1, further comprising receiving, from the agent program, messages indicating success or failure of the installation of the application.

7. The method of claim 1, wherein the agent program comprises a server-provider identifier for indicating its presence on the server.

8. The method of claim 1, wherein the agent program installs software dependencies related to the application or configuration files related to the application on the server.

9. The method of claim 1, further comprising a logging queue for receiving logging information from the agent program.

10. The method of claim 1, further comprising an event queue for storing and sending the commands.

11. A system for deploying an application, the system comprising: a computer processor configured for executing computer instructions for computationally executing the steps of: electronically receiving a request to deploy a cloud-based application, the request comprising information about the application but not including the application or portions thereof, wherein the request further includes information indicating for the application at least one of minimum, maximum, or average memory requirements, processing requirements, storage requirements, or bandwidth requirements; assigning a unique identifier to the received request; selecting a server from a plurality of servers upon which to deploy the application; sending a message to the server to allocate for the application at least one of memory, processing power, storage, or throughput on the server before the 12 application is deployed; causing installation of an agent program on the selected server; 14 storing a plurality of commands in a script queue, the commands comprising computer instructions for the installation and configuration of the application; and automatically sending the unique identifier that identifies the received request to deploy the cloud-based application to the agent program and sending commands to the agent program for execution of the commands on the server, the execution of the commands causing installation and configuration of the application on the server; and a computer memory for storing a plurality of commands in a script queue.

12. The system of claim 11, wherein the information about the application in the request comprises a name, type, or version of the application, an operating system or computing environment on which the application is to run or execute, a name or type of a cloud provider on which the application is to be deployed, or specifications of computing resources.

13. The system of claim 11, wherein the information about the application in the request comprises a data dependency with another cloud-based application.

14. The system of claim 11, wherein the agent program comprises a server-provider identifier for indicating its presence on the server.

15. The system of claim 11, wherein the agent program installs software dependencies related to the application or configuration files related to the application on the server.

16. The system of claim 11, wherein the computer memory further comprises a logging queue for receiving logging information from the agent program.

17. The system of claim 11, wherein the computer memory further comprises an event queue for storing and sending the commands.

* * * * *